(12) United States Patent
Buryak et al.

(10) Patent No.: US 8,635,172 B1
(45) Date of Patent: Jan. 21, 2014

(54) DYNAMIC TECHNIQUES FOR EVALUATING QUALITY OF CLUSTERING OR CLASSIFICATION SYSTEM AIMED TO MINIMIZE THE NUMBER OF MANUAL REVIEWS BASED ON BAYESIAN INFERENCE AND MARKOV CHAIN MONTE CARLO (MCMC) TECHNIQUES

(75) Inventors: Kirill Buryak, Sunnyvale, CA (US); Steven Lee Scott, Mountain View, CA (US); Steven Doubilet, San Francisco, CA (US)

(73) Assignee: Google Inc., Mountain View, CA (US)

( * ) Notice: Subject to any disclaimer, the term of this patent is extended or adjusted under 35 U.S.C. 154(b) by 284 days.

(21) Appl. No.: 13/267,937

(22) Filed: Oct. 7, 2011

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 7,801,839 B2* | 9/2010 | Kates et al. | 706/21 |
| 7,890,438 B2* | 2/2011 | Chidlovskii | 706/12 |
| 8,352,384 B2* | 1/2013 | Mansinghka et al. | 706/1 |
| 8,386,403 B2* | 2/2013 | Stephens | 706/12 |

OTHER PUBLICATIONS

Andrieu, Christophe et al., "An Introduction to MCMC for Machine Learning", Machine Learning, 2003, pp. 5-43, vol. 50.

* cited by examiner

*Primary Examiner* — Jeffrey A Gaffin
*Assistant Examiner* — Ola Olude Afolabi
(74) *Attorney, Agent, or Firm* — Remarck Law Group PLC

(57) ABSTRACT

Performance of the machine learning technique is assessed using Bayesian analysis where previously grouped documents belonging to a machine-assigned class or cluster are presented to a human rater and the rater's assessment is fed to the Bayesian analysis processor that updates a Beta bionomial model with each document. The model represents the precision probability associated with the class or cluster under test. Monitoring the precision probability, the technique enforces a set of stopping rules corresponding to an acceptance/rejection assessment of the machine learning apparatus. A Markov Chain Monte Carlo process operates on the model to infuse the processing of each subsequent class or cluster with knowledge from those previously processed.

20 Claims, 4 Drawing Sheets

DYNAMIC TECHNIQUES FOR EVALUATING QUALITY OF CLUSTERING OR CLASSIFICATION SYSTEM AIMED TO MINIMIZE THE NUMBER OF MANUAL REVIEWS BASED ON BAYESIAN INFERENCE AND MARKOV CHAIN MONTE CARLO (MCMC) TECHNIQUES

FIELD

The present disclosure relates generally to machine learning techniques and more particularly to techniques to improve performance of machine learning systems using Bayesian analysis to evaluate quality of clusters and/or classifications produced by those machine-learning systems.

BACKGROUND

This section provides background information related to the present disclosure which is not necessarily prior art.

Computer-implemented or machine learning-based clustering or classifier systems are often used to separate a corpus of documents (text-based documents, images, etc.) into classes or clusters of like documents, to which business use case labels may (or may not) be applied. For example, a first classifier might classify all documents relating to topic A, a second classifier for topic B, etc. Once classified in this automated fashion, the respective classes can then be used to assist a computer-implemented search algorithm or used to extract business information relevant to a particular user.

Clustering and classifier systems are often implemented using statistical models. Generally, a classification system will include several individual classifiers; whereas a clustering system may often employ just one clusterer. Classifiers are sometimes said to be "trained," using training data. A classifier system may thus be fed a set of training data that are digested by a machine learning algorithm to define a set of trained models, each model being associated with a class represented in the training data. The training data are pre-labeled as belonging to a particular class. Hence, classification is sometimes called supervised learning because the learning system is told what each set of training data represents. Clusterers are not trained in this fashion but instead generate clusters based on automatic discovery of the underlying structure, so clustering is sometimes called unsupervised learning.

By way of example, consider a supervised learning system designed to separate a corpus of email messages (documents) into different classes depending on what topic is discussed in the message. In supervised learning, a subject matter expert supplies the classifier with sample documents (training data) known to represent email messages relating to topic A, and the classifier stores parameters computed from those training data in a predetermined model for subsequent use in classifying later submitted documents. The supervised learning process would then be repeated for messages relating to topics B, C, and D, if desired, resulting in a set of trained models associated with a set of classifiers, each designed to recognize one of the topics A, B, C, D, etc.

Once trained, the set of classifiers may be used to identify whether a test document belongs to one of the trained topics. The test document is submitted to each of the classifiers (A, B, C, D, etc.) which are asked whether the test document belongs to its class. For example, if a test document about topic A is supplied, classifier A would respond with "yes," while the remaining classifiers would respond with "no." In some instances classifiers may also supply a likelihood score indicating how certain is its decision.

Clustering systems work in essentially the same way, except that the clusters do not have labels previously supplied by a human rater.

Over time, a classifier or clustering system's accuracy may drift, as the corpus of test documents evolves. Perhaps a new topic will be added, or perhaps some underlying document feature has changed, necessitating new training. In addition, when a particular cluster gets too large, it may be necessary to subdivide it, again necessitating new training. In all these scenarios, the system designer needs a way of assessing how well the classifier or clustering system is performing, to know when it is time to retrain the models or when to build new ones.

Assessing the performance of a classifier or clustering system has traditionally involved a great deal of human labor. Traditionally a human rater would individually look at each document within the assigned class or cluster and determine whether it does or does not belong. While there are some statistical techniques that can be used to ameliorate the task, the review process still involves a human looking at potentially hundreds or thousands of documents before the performance quality of the classifier or clustering system can be ascertained.

SUMMARY

This section provides a general summary of the disclosure, and is not a comprehensive disclosure of its full scope or all of its features.

Machine Learning Systems:

The techniques described here improve performance of machine learning systems using Bayesian analysis to evaluate quality of clusters and/or classifications produced by those machine-learning systems and thereby minimize the time and effort expended by a human rater, while still achieving the desired level of confidence in evaluating quality of clustering or classification. The techniques are applicable to both supervised machine learning systems, which generate classifications and unsupervised machine learning system, which generate clusters. As used herein the term "groupings" is used to collectively refer to "classifications" and "clusters." Thus unless otherwise expressly stated or apparent from the context, it is understood that the principles described here apply to both supervised and unsupervised machine learning systems.

In accordance with one disclosed technique, the performance of a machine learning system of the type that generates a grouping from a plurality of documents is determined using at least one processor that performs several steps as follows. At least one processor associates a precision probability distribution to the grouping and then initially sets the precision probability to a predetermined probability distribution, such as a uniform distribution. At least one processor then receives review information about a first document associated with the grouping and assigns that first document a first document rating indicating whether the machine learning technique correctly or incorrectly assigned that first document to the grouping. At least one processor then applies Bayesian inference using the first document rating to update the precision probability distribution.

The technique continues in iterative fashion to successively process subsequent documents associated with the grouping, by assigning the subsequent document a subsequent document rating indicating whether the classifier correctly or incorrectly assigned that subsequent document to the grouping; and to apply Bayesian inference using the subsequent document rating and the updated precision probability distribution to further update the precision probability distribution and to generate a grouping precision. The iterative process continues until terminated by a stopping rule that includes analyzing the relation of the grouping precision to at least one predetermined threshold. The grouping precision is used as a metric to assess performance of the machine learning system.

In accordance with some embodiments, the present disclosure relates to a technique of determining performance of a machine learning apparatus of the type that generates plural groupings each from a plurality of documents. The technique includes using at least one processor to perform a number of steps set forth below. The technique includes associating a precision probability distribution to one of the groupings based on Markov Chain Monte Carlo analysis of at least another of the plural groupings. The technique further includes receiving review information about a first document associated with the one of the groupings and assigning that first document a first document rating indicating whether the machine learning apparatus correctly or incorrectly assigned that first document to the first one of the groupings. Also, the technique includes applying Bayesian analysis using the first document rating to update the precision probability distribution. The technique additionally includes performing the following steps (a) and (b) until termination by a stopping rule that includes analyzing the relation of a grouping precision to at least one predetermined threshold: (a) successively processing subsequent documents associated with said one of the groupings by assigning that subsequent document a subsequent document rating indicating whether the machine learning apparatus correctly or incorrectly assigned that subsequent document to the one of said groupings; and (b) applying Bayesian analysis using the subsequent document rating and the updated precision probability distribution to further update the precision probability distribution and to thereby generate the grouping precision. The technique uses the grouping precision as a metric to assess performance of the machine learning system.

In accordance with some embodiments, the present disclosure relates to a technique of determining performance of a machine learning apparatus of the type that generates a grouping from a plurality of documents. The technique utilizes at least one processor to perform each of the following steps. The technique includes the step of associating a precision probability distribution to the grouping and initially setting the precision probability distribution to a predetermined distribution. The technique further includes receiving review information about a first document associated with the grouping and assigning that first document a first document rating indicating whether the machine learning apparatus correctly or incorrectly assigned that first document to the proper grouping. The technique applies Bayesian analysis using the first document rating to update the precision probability distribution. The technique also includes performing the following steps (a) and (b) until termination by a stopping rule that includes analyzing the relation of a grouping precision to at least one predetermined threshold: (a) successively processing subsequent documents associated with said grouping by assigning that subsequent document a subsequent document rating indicating whether the machine learning apparatus correctly or incorrectly assigned that subsequent document to the proper grouping, and (b) applying Bayesian analysis using the subsequent document rating and the updated precision probability distribution to further update the precision probability distribution and to thereby generate the grouping precision. The technique additionally includes using the grouping precision as a metric to assess performance of the machine learning system.

In accordance with some embodiments, the present disclosure relates to an apparatus for testing a machine learning apparatus of the type which generates a grouping from a plurality of documents. The apparatus includes a document review processor having associated non-transitory machine readable medium storing the plurality of documents, the document review processor generating a user interface that iteratively presents one-at-a-time the plurality of documents to a human rater, harvests the human rater's vote as to whether a presented document belongs to the grouping and stores the vote in the non-transitory machine readable medium in association with the presented document. The apparatus further includes a Bayesian inference processor receptive of the stored vote and operable to compute a precision probability distribution for the presented document associated with the vote. The Bayesian inference processor being further operable to enforce at least one stopping rule by comparing the computed precision probability distribution to at least one predetermined threshold. The Bayesian inference processor, upon enforcing said at least one stopping rule, will generate an output indicating whether the machine learning apparatus under test generated correct groupings with a probability above a predetermined threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. Example embodiments will now be described more fully in the detailed description below with reference to the accompanying drawings.

DETAILED DESCRIPTION

Figure 1:
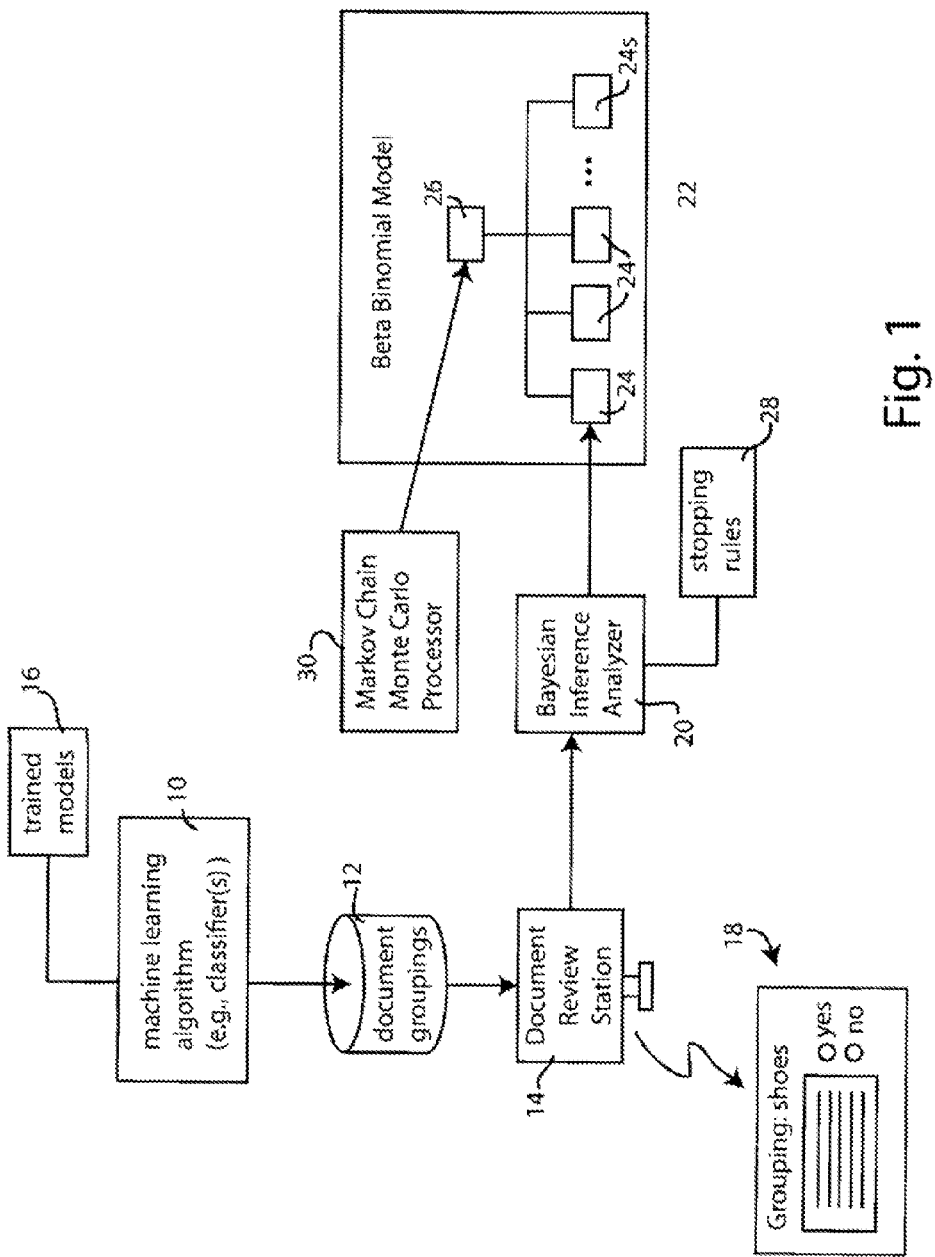
FIG. 1 is a block diagram of an apparatus employing Bayesian inference and Markov Chain Monte Carlo processor operating on a beta binomial model to determine performance of an exemplary classifier system.

To improve performance of machine learning systems and minimize the time and effort expended by human raters, the embodiments disclosed use Bayesian analysis mediated by a Markov Chain Monte Carlo (MCMC) process (processor) to evaluate quality of clusters and/or classifications (referred herein as groupings) produced by those machine-learning systems. A set of stopping rules monitor certain parameters generated by the techniques, allowing functional quality of the machine learning system to be assessed without the need to review all documents assigned to the grouping. Before giving a detailed description of the embodiments, an overview will be presented.

Bayesian Analysis:

The dynamic technique of evaluating quality seeks to minimize the number of documents the human rater must look at in order to assess the performance quality of the machine learning system. At the same time the technique seeks to retain high confidence that the quality assessment is correct. The technique associates a precision probability distribution with each document in the grouping. For the first document in the grouping, the technique assumes the precision probability distribution to be a uniform distribution. As the rater examines each document, the technique updates the precision probability distribution using a Bayesian analytical technique, with the result that the precision probability distribution serves as a model of what the prior experience has been. With this model of prior experience the system is better able to predict what the future will bring and is thus able to assess the quality of the grouping without the need for the human to examine every document in the grouping. Graphically depicted, the precision probability distribution curve shows the confidence level (probability) for any desired degree of precision.

Stopping Rules:

The technique exploits this Bayesian-generated precision probability distribution to determine when the human rater can stop examining documents. This is done by setting stopping rules; for example: stop when the precision probability distribution curve reflects that the confidence level is above 95% that the grouping precision is above 80%. That is, stop when there is a 95% probability that at least 80% of the documents correctly belong to the grouping (were the human rater to actually examine all documents in the grouping). The technique applies a second stopping rule to handle the case where the grouping does not pass muster: stop when the confidence level is above 95% that the grouping precision is below 80%. A third stopping rule terminates the process, to save time, if neither the first two stopping rules are met within a certain number of documents examined. The first stopping rule results in the machine learning system being judged favorably (accept); the second and third stopping rules result in the machine learning system being judged unfavorably (reject). The 80% and 95% values described here are exemplary and could be different, depending on system requirements.

Beta Binomial Model:

While Bayesian analysis can effectively be performed to assess the quality of a single machine learning classifier or single machine learning clustering system (i.e., a system producing a single grouping), the more practical situation involves perhaps hundreds or thousands of machine learning classifiers or clustering systems (one for each of a plurality of different groupings of interest). The technique exploits the predictive power of Bayesian analysis so that each grouping being examined benefits from knowledge obtained by prior examination of preceding groupings. To accomplish this, one example Bayesian analytical technique uses a Bayesian hierarchical model, known as a beta binomial model. The beta binomial model defines a tree structure having a root node and plural leaf nodes. The root node represents the distribution of grouping precision (how good of a job all of the machine learning classifiers or clustering systems collectively are doing). The leaf nodes each represent one of the individual groupings and are added to the tree structured beta binomial model as each new grouping is examined by the human rater.

Markov Chain Monte Carlo:

Each of the leaf nodes stores a single parameter representing the precision parameter for that grouping. The root node stores two parameters, representing the centrality and dispersion of the overall distribution of grouping precision. As each document is assessed by the human rater, the model is updated, taking into account not only the rater's assessment of the document in hand, but also the prior knowledge stored in the beta binomial model. With large systems, the beta binomial model can become quite complex, making it essentially impossible to update by hand. The technique thus uses a sampling/simulation technique known as Markov Chain Monte Carlo (MCMC) to update the model. While MCMC is specifically discussed herein, other sampling/simulation tools can be used.

The MCMC algorithm essentially samples (takes random draws from) the parameters stored in the model and iteratively arrives at a new overall grouping precision distribution. It iteratively uses samples of the leaf node parameters to compute or estimate parameters for the root node and then uses the root node to compute subsequent parameters for the leaf nodes, and so forth. In this way the MCMC algorithm fits the beta binomial model to the observed data from the human rater and exploits a concept called shrinkage whereby information stored in the root is shared across leaf nodes.

The above-described technique may be applied to both unsupervised and supervised learning systems. In an unsupervised learning system (e.g., clusterer) cluster precision will typically be evaluated with respect to multiple topics in a given cluster; whereas in a supervised learning system (e.g., classifier) classifier precision is typically evaluated for one topic for a given classifier.

Referring to FIG. 1, an exemplary machine learning system has been illustrated at 10. The machine learning system generates a data store of document groupings 12 which are then accessed by a document review station 14 operated by a human rater. By way of example, the machine learning system 10 may be a supervised machine learning system (classifier) in which case the document groupings would correspond to documents that are classified based on the trained models 16. Alternatively, the machine learning system 10 may be a clustering system, in which case the document groupings would correspond to document clusters based on the trained models 16.

As used here, the term "document" refers to a unit of digitized information. Examples include text files, digital image data files, audio and video files, and the like.

As part of the document review or curation process, the human rater uses the document review station 14 to retrieve a first record from the document grouping data store, which corresponds to a first document belonging to a designated grouping. For example, if the documents are text-based web pages organized into groupings by different topics, the human rater might be reviewing documents assigned to the grouping: shoes. The document review station produces an on-screen display 18 identifying the grouping under consideration (shoes) and displaying the first document of that grouping. The human rater examines the displayed document to determine whether it does or does not belong to the assigned grouping and enters his or her assessment (yes/no) in the user interface provided.

The document review station 14 sends the human rater's vote as Boolean binary data (yes/no) to the Bayesian inference analyzer 20 implemented by a computer processor. The Bayesian inference analyzer uses the rater's decision as observation data to update a precision probability distribution which the Bayesian inference analyzer 20 stores in non-transitory computer-readable memory 22 associated with its processor. The Bayesian inference analyzer 20 operates upon a Beta binomial model, which has been depicted diagrammatically at 22 to include a plurality of Level 0 leaf nodes 24 coupled in tree structure fashion to a Level 1 root node 26. The leaf nodes each correspond to one of the groupings generated by the machine learning system 10. Each leaf node stores a precision distribution calculated by the Beta function: Beta $(\alpha, \beta)$. The parameters $(\alpha, \beta)$ correspond respectively to the success or failure of a given document to belong to the grouping. When the human rater's vote is a "yes", the success parameter $\alpha$ is incremented by 1. Thus, the Beta function becomes Beta $(\alpha+1, \beta)$. Conversely, when the rater's vote is "no", the Beta function is updated by incrementing the failure parameter: Beta $(\alpha, \beta+1)$. While there are many suitable ways of implementing the Beta function, a suitable library may be found in the R statistical computing package available at http://www.r-project.org/.

The document review station 14 and Bayesian inference analyzer 20 work together to process the human rater's votes and update the precision probability distribution, one grouping at a time. Each time a new grouping is begun for analysis, a new leaf node 24 is added to the Beta binomial model. Thus, for example, the precision probability distribution for the grouping "shoes" would correspond to the leaf node 24s (the most newly added node in the tree).

Bayesian inference analysis upon each individual grouping allows the apparatus to enforce a set of stopping rules stored in non-transitory computer-readable memory 28. These stopping rules allow the system to make an accept/reject decision as to the quality of the grouping, in most cases long before the human rater has examined all documents within that grouping. This saves substantial time and effort and a commensurate savings in cost. While Bayesian inference alone affords a significant time, effort and cost savings, the illustrated embodiment implements another component that improves the system even further.

A Markov Chain Monte Carlo (MCMC) processor 30 operates upon the Beta binomial model stored in memory 22, allowing information learned while processing a first grouping to improve the predictive ability of Bayesian inferences drawn about later processed groupings. The Markov Chain Monte Carlo processor 30 is thus invoked after the Bayesian inference analyzer has made its accept/reject decision about the current grouping under test. The Markov Chain Monte Carlo processor samples data stored in the leaf nodes by the Bayesian inference analyzer 20 and estimates an overall grouping precision distribution stored in the root node 26 from the sampled data. Whereas each of the leaf nodes corresponds to a single grouping, the root node corresponds to a probability distribution for the entire set of groupings.

The Bayesian inference analyzer 20 uses information from the root node in making its inference assessment of each grouping under test. In this way, the system gradually benefits more and more from the collective knowledge stored in the root node. At first, the root node has little or no information about the leaf nodes, thus the first groupings assessed by the Bayesian inference analyzer are assessed primarily on the observations about those groupings, and the Bayesian inferences drawn therefrom. As later groupings are examined, the root node contributes more and more to the leaf node assessment, allowing the system to make its stopping rules assessment even more quickly and with high accuracy.

Figure 2:
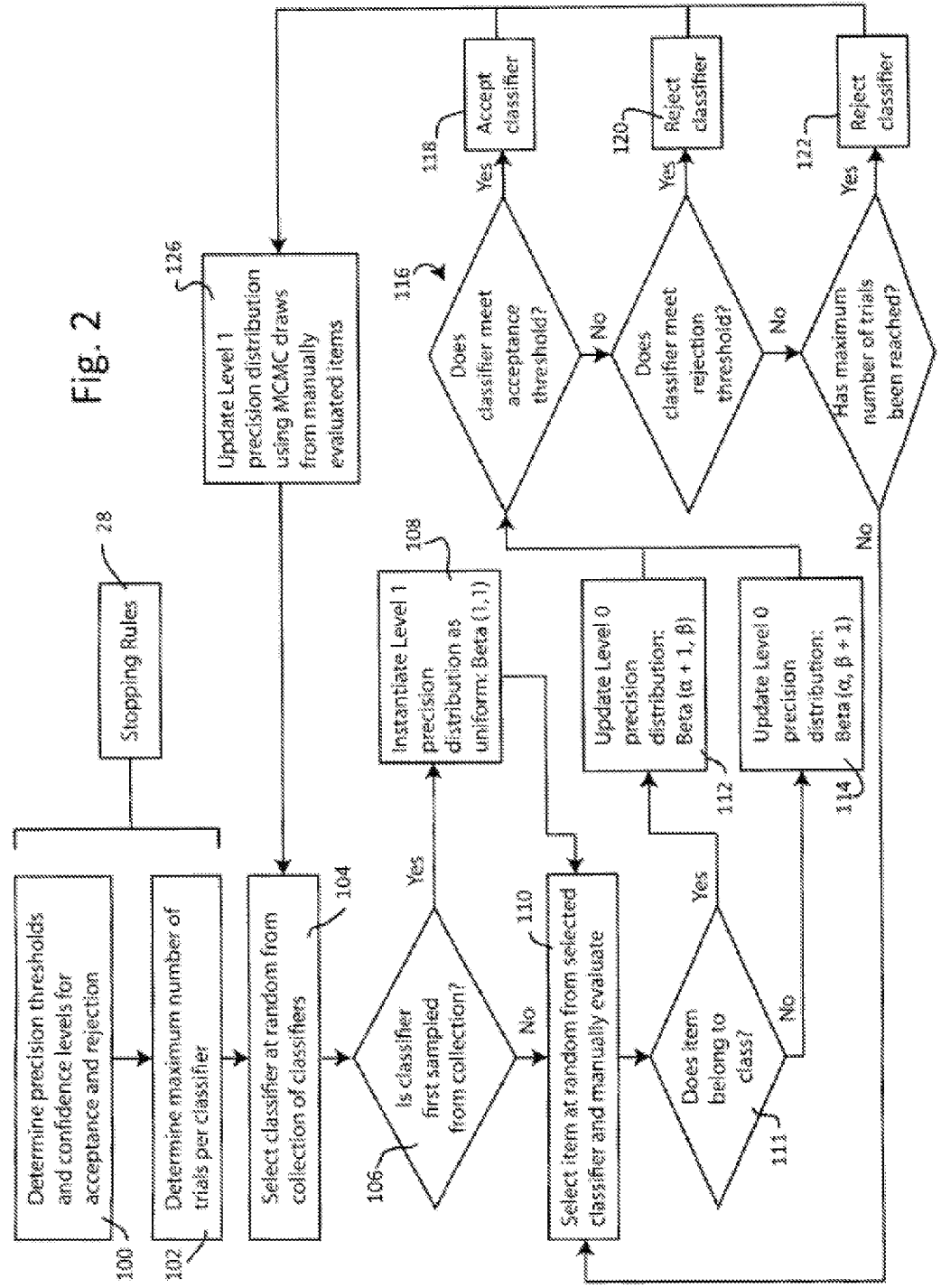
FIG. 2 is a flowchart diagram illustrating an example technique for determining performance of a machine learning classifier or clustering system.

Turning now to FIG. 2, the operation of the apparatus of FIG. 1 will be further explained. In the flow chart of FIG. 2, it is assumed that the machine learning system is a classifier and thus the document groupings represent classes based on the trained models of the classifier. The process begins at steps 100 and 102 where the stopping rules are stored in the stopping rules memory 28 (FIG. 1). Thus at step 100 the precision threshold and confidence levels are determined for acceptance and rejection of a document. For example, the acceptance rule may require a 95% confidence level that the precision is above 80%. Similarly, the rejection rule might require a 95% confidence level that the precision probability is below 80%. A maximum number of trials per classifier is set at step 102 to terminate review and thus reject the classifier if a maximum number of trials is reached. An exemplary value for such maximum number might be 20 trials.

Next at step 104, a classifier is selected at random from the collection of classifiers stored in the document grouping data store 12 (FIG. 1). As at 106, if the selected classifier is the first one selected from the collection, then a Level 1 precision distribution is set at 108 to be a uniform distribution: Beta (1,1). Thus referring to FIG. 1, the precision distribution at root node 26 would be set to a uniform distribution. As will be seen, the review of subsequent classifiers do not make this initial assumption of a uniform distribution. Rather they use the precision distribution as calculated by the Markov Chain Monte Carlo processor 30 (FIG. 1).

After instantiating the Level 1 precision distribution to be uniform at step 108, processing continues at step 110. Note that step 110 is also reached directly (without instantiating Level 1 to uniform) if the classifier selected at step 104 is not the first classifier sampled from the collection.

At step 110, a first item (document) is selected at random from the selected classifier and presented to the human rater by displaying it at the document review station 14 (FIG. 1). The rater is presented an on-screen display question of whether the item (document) belongs to the class associated with the classifier under test, as at step 111. The rater supplies his or her answer by suitable manipulation of the document review station user interface and the answer (yes/no) is supplied to the Bayesian inference analyzer 20 (FIG. 1), which then updates the precision distribution as illustrated at 112 (for the "yes" case) and at 114 (for the "no" case). As previously discussed, the Bayesian inference analyzer 20 updates the precision distribution by incrementing either the a parameter (step 112) or the $\beta$ parameter (step 114) of the Beta function programmed into the Bayesian inference analyzer 20.

Having updated the distribution according to the human rater assessment of the randomly selected item (document), the technique next tests whether any of the stopping rules have been met. Shown generally at 116, the stopping rules are applied to assess whether the precision thresholds and confidence levels have reached the point where the classifier can be accepted, as at 118, or rejected, as at 120. The third stopping rule, whether the maximum number of trials has been reached, is also tested for and may serve as another reason to reject the classifier as at 122. If none of the stopping rules are satisfied, the technique loops back to step 110 where the next item (document) is randomly selected from the classifier under test, whereupon the procedure repeats until a stopping rule is satisfied.

Figure 3:
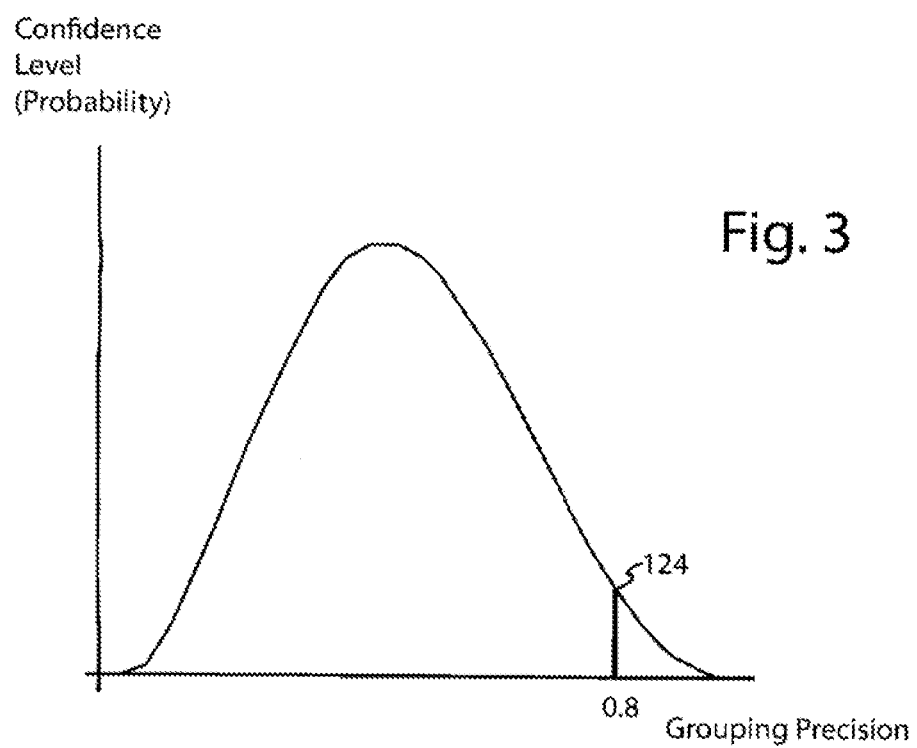
FIG. 3 is an example graph showing an example precision probability distribution to which precision thresholds and confidence levels are assessed.

By way of illustration, an exemplary precision probability graph has been illustrated at FIG. 3. The graph plots grouping precision (i.e., classification precision or cluster precision) along the x-axis and a confidence level (probability) along the y-axis. The precision threshold has been indicated at 124. Thus, the portions of the precision probability curve to the right of the precision threshold line represent precision greater than 80% (in this case) and portions of the curve to the left of precision threshold 124 represent precisions less than 80% (in this case).

Returning now to FIG. 2, once any of the stopping rules at 28 have been met, the technique proceeds to step 126 where the Markov Chain Monte Carlo (MCMC) processor 30 (FIG. 1) updates the Level 1 precision distribution. The MCMC processor does this by making a plurality of draws or samples from the manually evaluated items; that is, from the data stored in the leaf nodes 24 of the Beta binomial model (FIG. 1).

Figure 4:
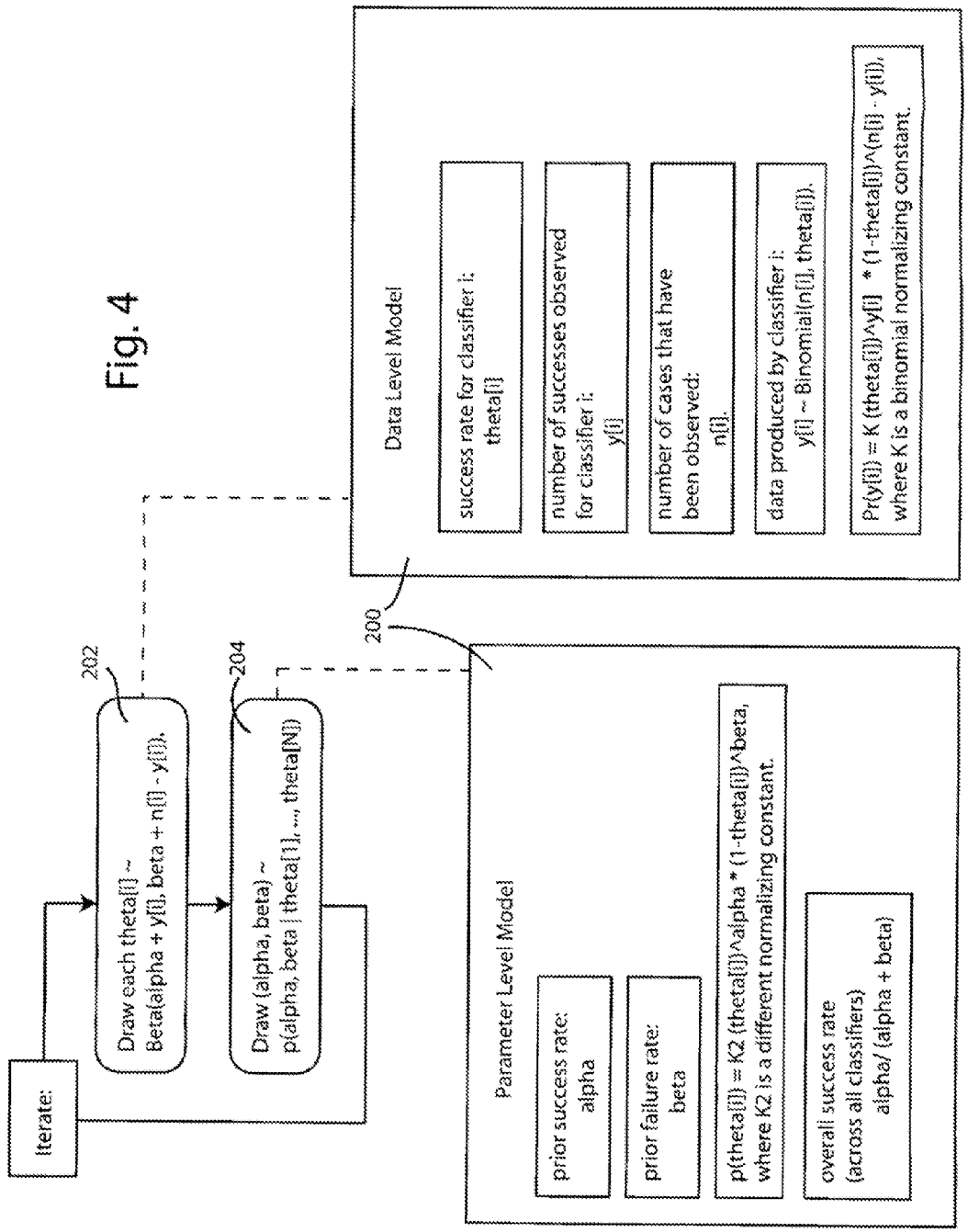
FIG. 4 is a flowchart diagram further describing the Markov Chain Monte Carlo processor.

FIG. 4 shows in greater detail how the Markov Chain Monte Carlo processor functions. The Markov Chain Monte Carlo processor operates upon a model 200 that describes both data level information and parameter level information. The processor iteratively performs computer processing steps 202 and 204 to produce a sequence of draws that are sequentially correlated across iterations. In describing FIG. 4 a machine learning classifier has been assumed. It will be understood that this explanation would also apply to machine learning clusterers.

In further detail model 200 may be described as follows:

(Data Level): Suppose there are N classifiers being assessed. The success rate for classifier i is theta[i] (a number between 0 and 1). The number of successes that have been observed for this classifier is y[i]. The number of cases that have been observed is n[i]. Thus an empirical estimate of theta[i] is y[i]/n[i]. The model for the data produced by classifier i is y[i] ~Binomial(n[i], theta[i]). That is Pr(y[i])=K (theta[i])^y[i]*(1−theta[i])^(n[i]−y[i]), where K is a binomial normalizing constant.

(Parameter Level): Suppose that theta[i]~Beta(alpha, beta). That is: p(theta[i])=K2 (theta[i])^alpha*(1−theta[i])^beta, where K2 is a different normalizing constant. This distribution is "conjugate" to the binomial distribution, which means that they have the same functional form. The only difference is that at the data level, y[i] is the random variable. At the parameter level, theta[i] is the random variable. alpha and beta are global model parameters that describe the success rates for a typical classifier, and the amount of dispersion among classifiers. People often think of "alpha" as "prior successes" and "beta" as "prior failures". Thus an estimate of the overall success rate (across all classifiers) is alpha/(alpha+beta). If alpha+beta is a large number, then the individual theta[i]'s will all be very close to alpha/(alpha+beta). If it is small then the success rates theta[i] can vary substantially from one classifier to the next.

Prior. One of the inputs into a Bayesian analysis is a prior distribution specifying your belief about model parameters before seeing any data. Our prior is p(alpha, beta). If we have not seen any data then we want our prior to reflect ignorance. We can accomplish this by setting p(alpha/(alpha+beta))~U(0, 1), and p(alpha+beta)~Gamma(0.1.1). The prior on alpha/(alpha+beta) obviously says that we have no information about the location parameter. The prior on alpha+beta favors values close to zero, but it is heavy tailed, so values far from zero are not penalized very much.

The unknowns in model 200 are (alpha, beta, theta[1], ... , theta[N]). If the theta[i]'s were observed, then it would be easy to estimate alpha and beta. If alpha and beta had been observed, then it would be easy to estimate each theta[i] from n[i] and y[i].

One iteration of the MCMC algorithm looks like this:

[Step 1] Draw each theta[i]~Beta(alpha+y[i], beta+n[i]−y[i]).

[Step 2] Draw (alpha, beta)~p(alpha, beta|theta[1], ... , theta[N])

Step 1 of the algorithm can be done in closed form, because conjugacy implies that p(theta[i] |alpha, beta, y[i], n[i]) is still a beta distribution, so all you need to do is work out the parameters. Step 2 is somewhat more complicated because p(alpha, beta|theta) is not a named distribution. It is proportional to:

p(alpha,beta)*product_i Beta(theta[i]|alpha,beta).

There are several options for how to make this draw. In some embodiments, a "slice sampler" is used (described in Neal 2003, Annals of Statistics). Others possible implementations might use a Metropolis-Hastings step.

The MCMC algorithm is run for a long time (a few thousand iterations). It produces a sequence of draws that are sequentially correlated across iterations. But time averages (across iterations) of any subset of unknowns have very similar properties to averages of draws from a hypothetical sampler that could produce independent draws. Thus (for example) you can estimate the upper and lower confidence limits for theta[i] from this Monte Carlo sample, and those upper and lower limits will capture the fact that you don't know exact values for alpha and beta.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of determining performance of a machine learning apparatus of the type that generates plural groupings each from a plurality of documents, comprising:
    using at least one processor to perform each of the following steps:
    associating a precision probability distribution to one of said groupings based on Markov Chain Monte Carlo analysis of at least another of said plural groupings;
    receiving review information about a first document associated with said one of said groupings and assigning that first document a first document rating indicating whether the machine learning apparatus correctly or incorrectly assigned that first document to said first one of said groupings;
    applying Bayesian analysis using said first document rating to update said precision probability distribution;
    performing the following steps (a) and (b) until termination by a stopping rule that includes analyzing the relation of a grouping precision to at least one predetermined threshold:
    (a) successively processing subsequent documents associated with said one of said groupings by assigning that subsequent document a subsequent document rating indicating whether the machine learning apparatus correctly or incorrectly assigned that subsequent document to said one of said groupings;

(b) applying Bayesian analysis using said subsequent document rating and the updated precision probability distribution to further update the precision probability distribution and to thereby generate said grouping precision;

using the grouping precision as a metric to assess performance of said machine learning system.

2. A method of determining performance of a machine learning apparatus of the type that generates a grouping from a plurality of documents, comprising:

using at least one processor to perform each of the following steps:

associating a precision probability distribution to said grouping;

initially setting said precision probability distribution to a predetermined distribution;

receiving review information about a first document associated with the grouping and assigning that first document a first document rating indicating whether the machine learning apparatus correctly or incorrectly assigned that first document to the proper grouping;

applying Bayesian analysis using said first document rating to update said precision probability distribution;

performing the following steps (a) and (b) until termination by a stopping rule that includes analyzing the relation of a grouping precision to at least one predetermined threshold:

(a) successively processing subsequent documents associated with said grouping by assigning that subsequent document a subsequent document rating indicating whether the machine learning apparatus correctly or incorrectly assigned that subsequent document to the proper grouping;

(b) applying Bayesian analysis using said subsequent document rating and the updated precision probability distribution to further update the precision probability distribution and to thereby generate said grouping precision;

using the grouping precision as a metric to assess performance of said machine learning system.

3. The method of claim 2 wherein said initially set predetermined distribution is a uniform distribution.

4. The method of claim 2 wherein said initially set predetermined distribution is a probability distribution based on information from previously analyzed groupings.

5. The method of claim 2 further comprising expressing said precision probability distribution as a beta binomial model having a root node and plural leaf nodes, wherein the precision probability distribution is represented by one of said plural leaf nodes and wherein the root node represents an overall grouping precision distribution of the collective plural leaf nodes.

6. The method of claim 5 wherein said root node is populated by estimation based upon the plural leaf nodes.

7. The method of claim 2 further comprising expressing said precision probability distribution as a tree-structured model having a root node and plural leaf nodes, and further comprising using Markov Chain Monte Carlo simulation to populate the root node.

8. The method of claim 7 further comprising using said root node to establish said initially set predetermined distribution.

9. The method of claim 2 wherein said stopping rule comprises an acceptance rule where the grouping precision is above a predetermined threshold.

10. The method of claim 2 wherein said stopping rule comprises a rejection rule where the grouping precision is below a predetermined threshold.

11. The method of claim 2 wherein said stopping rule comprises a rejection rule that is triggered after a predetermined number of said subsequent documents have been processed.

12. An apparatus for testing a machine learning apparatus of the type which generates a grouping from a plurality of documents, comprising:

a document review processor having associated non-transitory machine readable medium storing said plurality of documents, the document review processor generating a user interface that iteratively presents one-at-a-time said plurality of documents to a human rater, harvests the human rater's vote as to whether a presented document belongs to the grouping and stores said vote in said non-transitory machine readable medium in association with the presented document;

a Bayesian inference processor receptive of the stored vote and operable to compute a precision probability distribution for the presented document associated with said vote;

said Bayesian inference processor being further operable to enforce at least one stopping rule by comparing the computed precision probability distribution to at least one predetermined threshold;

said Bayesian inference processor, upon enforcing said at least one stopping rule, generating an output indicating whether the machine learning apparatus under test generated correct groupings with a probability above a predetermined threshold.

13. The apparatus of claim 12 further comprising Markov Chain Monte Carlo processor having associated non-transitory machine readable medium configured to include a beta bionomial model data structure having a root node and plural leaf nodes, wherein the precision probability distribution is represented by one of said plural leaf nodes and wherein the root node represents an overall grouping precision distribution of the collective plural leaf nodes.

14. The apparatus of claim 13 wherein said Markov Chain Monte Carlo processor computes prior probability information that is supplied to said Bayesian inference processor for use in computing said precision probability distribution.

15. The apparatus of claim 12 wherein said Bayesian inference processor enforces a stopping rule comprising an acceptance rule where the grouping precision is above a predetermined threshold.

16. The apparatus of claim 12 wherein said Bayesian inference processor enforces a stopping rule comprising a rejection rule where the grouping precision is below a predetermined threshold.

17. The apparatus of claim 12 wherein said Bayesian inference processor enforces a stopping rule comprising a rejection rule that is triggered after a predetermined number of documents have been presented to the human rater.

18. The apparatus of claim 12 wherein said Bayesian inference processor computes said precision probability distribution using a beta binomial model stored in a non-transitory machine readable medium.

19. The apparatus of claim 18 wherein said beta binomial model has a root node and a plurality of leaf nodes, wherein the precision probability distribution is represented by one of said plural leaf nodes and wherein the root node represents an overall grouping precision distribution of the collective plural leaf nodes.

20. The apparatus of claim 19 wherein said Bayesian inference processor populates the root node by estimation based upon the plural leaf nodes.

* * * * *